(12) United States Patent
Jones et al.

(10) Patent No.: US 8,777,386 B2
(45) Date of Patent: Jul. 15, 2014

(54) SOLID INK STICK HAVING IDENTICAL IDENTIFYING FEATURES ON A PLURALITY OF EDGES

(71) Applicant: Xerox Corporation, Norwalk, CT (US)

(72) Inventors: Brent R. Jones, Sherwood, OR (US); Frederick T. Mattern, Portland, OR (US); Brian W. Aznoe, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 113 days.

(21) Appl. No.: 13/653,772

(22) Filed: Oct. 17, 2012

(65) Prior Publication Data

US 2014/0104352 A1   Apr. 17, 2014

(51) Int. Cl.
  *B41J 2/175*  (2006.01)
  *C09D 11/00*  (2014.01)

(52) U.S. Cl.
  CPC ............. *B41J 2/17593* (2013.01); *B41J 2/175* (2013.01); *C09D 11/34* (2013.01)
  USPC ............................................. 347/88; 347/99

(58) Field of Classification Search
  CPC ........ B41J 2/17593; B41J 2/175; C09D 11/34
  USPC ..................................................... 347/88, 99
  See application file for complete search history.

(56) References Cited

U.S. PATENT DOCUMENTS

| | | |
|---|---|---|
| 3,722,240 A | 3/1973 | Spain et al. |
| 4,636,803 A | 1/1987 | Mikalsen |
| 4,723,135 A | 2/1988 | Yano et al. |
| 4,889,560 A | 12/1989 | Jaeger et al. |
| 5,023,388 A | 6/1991 | Luker |
| 5,135,165 A | 8/1992 | Greenhow |
| 5,181,049 A | 1/1993 | Mackay et al. |
| 5,223,860 A | 6/1993 | Loofbourow et al. |
| 5,442,387 A | 8/1995 | Loofbourow et al. |
| 5,734,402 A | 3/1998 | Rousseau et al. |
| 5,861,903 A | 1/1999 | Crawford et al. |
| 5,908,950 A | 6/1999 | Cooke et al. |
| 5,975,688 A | 11/1999 | Kanaya et al. |
| 5,975,690 A | 11/1999 | Grellmann et al. |
| 5,988,805 A | 11/1999 | Meinhardt |
| 6,053,608 A | 4/2000 | Ishii et al. |
| 6,213,600 B1 | 4/2001 | Kobayashi et al. |
| 6,353,479 B1 | 3/2002 | Lubawy et al. |
| 6,422,694 B1 | 7/2002 | Hollands |
| 6,543,867 B1 | 4/2003 | Jones |
| 6,572,225 B1 | 6/2003 | Jones |
| 6,672,716 B2 | 1/2004 | Jones |
| 6,719,419 B2 | 4/2004 | Jones et al. |
| 6,722,764 B2 | 4/2004 | Jones et al. |
| 6,739,713 B2 | 5/2004 | Jones et al. |
| 6,755,517 B2 | 6/2004 | Jones et al. |
| 6,761,443 B2 | 7/2004 | Jones |

(Continued)

*Primary Examiner* — Matthew Luu
*Assistant Examiner* — Rut Patel
(74) *Attorney, Agent, or Firm* — Maginot, Moore & Beck, LLP

(57) ABSTRACT

A solid ink stick enables identification of the ink stick in a variety of different orientations, while preventing the ink stick from being inserted into an ink loader in an orientation in which the ink stick cannot be identified. The ink stick includes two polygon end surfaces opposite one another. Each edge of the end surfaces has a first and a second identifier, which are identical to one another to enable the ink stick to be inserted into an ink loader without regard to the orientation of the edges.

17 Claims, 4 Drawing Sheets

(56) References Cited

U.S. PATENT DOCUMENTS

| | | | |
|---|---|---|---|
| 6,840,612 B2 | 1/2005 | Jones et al. |
| 6,986,570 B2 | 1/2006 | Jones et al. |
| 7,063,412 B2 | 6/2006 | Jones et al. |
| 7,108,363 B2 | 9/2006 | Jones et al. |
| 7,163,273 B2 | 1/2007 | Silverbrook |
| 7,438,402 B2 | 10/2008 | Jones et al. |
| 7,517,072 B2 | 4/2009 | Jones et al. |
| 7,537,326 B2 | 5/2009 | Jones |
| 7,553,008 B2 | 6/2009 | Jones |
| 7,648,232 B2 | 1/2010 | Jones |
| 7,690,775 B2 | 4/2010 | Jones et al. |
| 7,695,126 B2 | 4/2010 | Jones et al. |
| 7,726,798 B2 | 6/2010 | Mattern et al. |
| 7,753,509 B2 | 7/2010 | Chambers et al. |
| 7,753,511 B2 | 7/2010 | Jones et al. |
| 7,762,655 B2 | 7/2010 | Fairchild et al. |
| 7,780,283 B2 | 8/2010 | Jones |
| 7,780,284 B2 | 8/2010 | Fairchild et al. |
| 7,794,072 B2 | 9/2010 | Esplin et al. |
| 7,798,624 B2 | 9/2010 | Fairchild et al. |
| 7,798,626 B2 | 9/2010 | Jones et al. |
| 7,798,627 B2 | 9/2010 | Esplin et al. |
| 7,802,880 B2 | 9/2010 | Jones et al. |
| 7,810,918 B2 | 10/2010 | Jones et al. |
| 7,819,513 B2 | 10/2010 | Fairchild |
| 7,837,317 B2 | 11/2010 | Gold et al. |
| 7,854,501 B2 | 12/2010 | Jones |
| 7,857,439 B2 | 12/2010 | Jones et al. |
| 7,857,440 B2 | 12/2010 | Gold et al. |
| 7,874,661 B2 | 1/2011 | Tidrick |
| 7,878,641 B2 | 2/2011 | Fairchild et al. |
| 7,883,195 B2 | 2/2011 | Fairchild et al. |
| 7,883,196 B2 | 2/2011 | Mattern et al. |
| 7,891,792 B2 | 2/2011 | Gold et al. |
| 7,942,515 B2 | 5/2011 | Mattern et al. |
| 7,971,980 B2 | 7/2011 | Jones et al. |
| 7,976,144 B2 | 7/2011 | Esplin et al. |
| 8,007,095 B2 | 8/2011 | Tidrick |
| 8,016,403 B2 | 9/2011 | Jones et al. |
| 8,025,385 B2 | 9/2011 | Jones et al. |
| 8,075,118 B2 | 12/2011 | Chambers et al. |
| 8,075,119 B2 | 12/2011 | Fairchild |
| 8,096,647 B2 | 1/2012 | Jones |
| 8,167,418 B2 | 5/2012 | Jones |
| 8,240,831 B2 | 8/2012 | Dixon |
| 2003/0038851 A1 | 2/2003 | Oriol |
| 2003/0202056 A1 | 10/2003 | Jones et al. |
| 2003/0202074 A1 | 10/2003 | Jones |
| 2003/0202077 A1 | 10/2003 | Jones et al. |
| 2003/0202078 A1 | 10/2003 | Jones et al. |
| 2006/0279617 A1 | 12/2006 | Korn et al. |
| 2008/0088688 A1 | 4/2008 | Jones et al. |
| 2008/0117265 A1 | 5/2008 | Esplin et al. |
| 2012/0013689 A1 | 1/2012 | Gold et al. |
| 2012/0092425 A1 | 4/2012 | Mattern et al. |

US 8,777,386 B2

SOLID INK STICK HAVING IDENTICAL IDENTIFYING FEATURES ON A PLURALITY OF EDGES

TECHNICAL FIELD

This disclosure relates generally to phase change ink sticks, and, in particular, to phase change ink sticks having identifying features.

BACKGROUND

Solid ink or phase change ink printers conventionally receive ink in various solid forms, such as ink sticks. The solid ink sticks are typically inserted through an insertion opening of an ink loader for the printer, and the ink sticks are moved along a feed channel by a feed mechanism and/or gravity toward a melting device. The melting device heats the solid ink impinging on the device until it melts. The melted ink is collected and delivered to a printhead for jetting onto a recording medium.

Known ink sticks are variously configured with predetermined protuberances and indentations that serve a number of purposes. Some previously known solid ink stick configurations included protuberances and indentations that restrict the insertion of solid ink sticks into particular feed channel openings. In other configurations, some of the protuberances and indentations are used to guide the ink stick through a feed channel, to limit the interaction of the ink stick with feed channel structures, to interact with identification sensors within the ink loading device, or to activate sensors positioned along the feed channel to provide information regarding the position of the ink stick in a feed channel. Other protuberances and indentations provide humanly perceptible indicia that help a user identify an ink stick color or help a user correlate an ink stick with a particular printer or feed channel in a printer. In each ink stick configuration, a balance is required between ink stick esthetics, unique identification, ease of manufacture, intended usage for different printer configurations, user orientation with respect to an ink loading device, the need to provide a customer with a reasonable volume of ink that will withstand manual handling and maneuvering along a feed channel to a melting device, and the need to provide an ink stick that facilitates easy insertion into the printer. Attempts to satisfy all of the design goals generally lead to non-ideal compromises. Consequently, efforts to improve solid ink stick design are ongoing.

SUMMARY

In one embodiment of a solid ink stick, a solid ink body has a length, a width, a height, and two ends. A first surface of the solid ink body has a shape of a polygon with each end edge of the polygon of the first surface including a first identifier and a second identifier. Each of the first identifiers on the edges of the first surface is identical to one another, and the first identifiers on opposite edges of the polygon are on opposite portions of the opposite edges. Each of the second identifiers on the edges of the first surface are also identical to one another, and the second identifiers on opposite edges of the polygon are on opposite portions of the opposite edges. The solid ink body also has a second surface with a shape that is the shape of the polygon of the first surface and is located on a side of the solid ink body that is opposite the first surface. Each edge of the polygon of the second surface includes the first identifier and the second identifier with each of the first identifiers on the edges of the second surface being identical to one another, and the first identifiers on opposite edges of the polygon of the second surface being on opposite portions of the opposite edges of the polygon of the second surface and being on opposite portions of edges of the polygon of the first surface that are opposite the edges of the second surface on the solid ink body. Each of the second identifiers on the edges of the second surface are also identical to one another, and the second identifiers on opposite edges of the polygon of the second surface are on opposite portions of the opposite edges of the polygon of the second surface and are on opposite portions of edges of the polygon of the first surface that are opposite the edges of the second surface on the solid ink body.

Another embodiment of the solid ink stick has a solid ink body with a length, a width, and a height that form a rectangular solid, and the width and height of the solid ink body are equal, while the length of the solid ink body is greater than the width and the height of the solid ink body. The solid ink body has a first end surface having a square shape that is defined by the width and the height of the solid ink body with each edge of the first end surface including a first identifier and a second identifier. Each of the first identifiers on the edges of the first end surface is identical to one another and the first identifiers on opposite edges of the first end surface are on opposite portions of the opposite edges. Each of the second identifiers on the edges of the first end surface is identical to one another and the second identifiers on opposite edges of the first end surface are on opposite portions of the opposite edges. The solid ink body has a second end surface having the square shape that is defined by the width and the height of the solid ink body and is located on a side of the solid ink body that is opposite the first surface. Each edge of the second end surface includes the first identifier and the second identifier with each of the first identifiers on the edges of the second end surface being identical to one another and the first identifiers on opposite edges of the second end surface being on opposite portions of the opposite edges of the second end surface and being on opposite portions of edges of the first end surface that are opposite the edges of the second end surface on the solid ink body. Each of the second identifiers on the edges of the second end surface are identical to one another and the second identifiers on opposite edges of the second end surface are on opposite portions of the opposite edges of the second end surface and are on opposite portions of edges of the first end surface that are opposite the edges of the second end surface on the solid ink body. The first identifiers correspond to a color of the ink stick and the second identifiers correspond to data about the ink stick.

DETAILED DESCRIPTION

Figure 1:
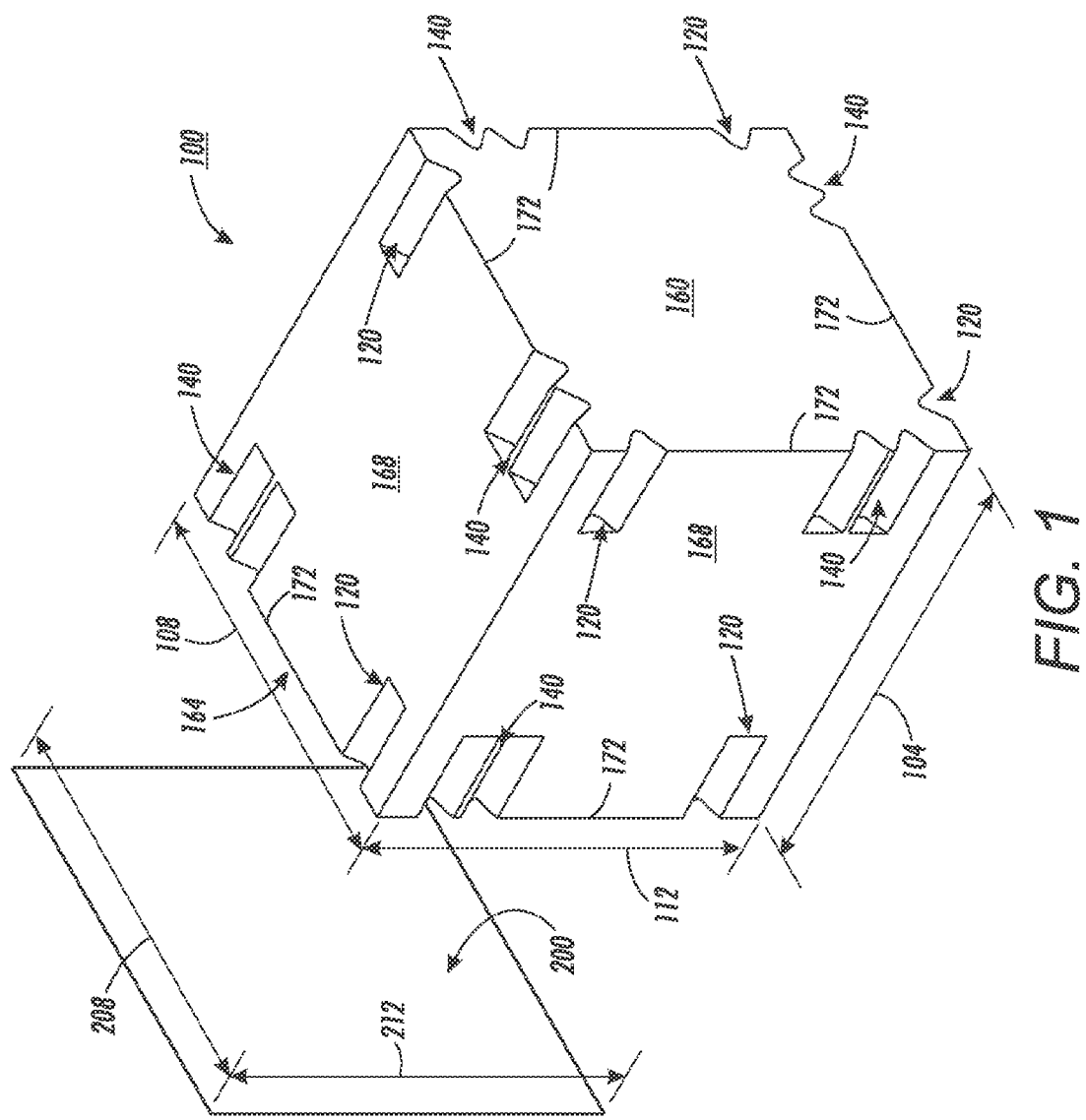
FIG. 1 is a side perspective view of an ink stick configured to incorporate two types of data without severely restricting orientation of the ink stick during insertion into a printer.

For a general understanding of the present embodiments, reference is made to the drawings. In the drawings, like reference numerals have been used throughout to designate like elements. As used herein, the terms "printer," "printing device," or "imaging device" generally refer to a device that produces an image with one or more colorants on print media and may encompass any such apparatus, such as a digital copier, bookmaking machine, facsimile machine, multi-function machine, or the like, which generates printed images for any purpose. Image data generally include information in electronic form which are rendered and used to operate printer components to distribute one or more colorants to form a printed image on print media. In inkjet printers, the printer components that are operated to disburse colorants are inkjet ejectors that are typically arranged in one or more arrays within a printhead. Phase-change ink printers use phase-change ink, also referred to as a solid ink, which is in a solid state at room temperature but melts into a liquid state at a higher operating temperature.

FIG. 1 is a perspective view of a solid ink stick 100 and an ink stick insertion port 200. The solid ink stick 100 includes a first end surface 160, a second end surface 164, and four side surfaces 168. The ink stick 100 has a width 108 and a height 112, which are equal, and a length 104, which is greater than the width 108 and height 112. The end surfaces 160 and 164 each have a square shape, which is defined by the width 108 and height 112 of the ink stick 100, while the side surfaces 168 have a rectangular shape defined by the length 104 and one of the width 108 and height 112 of the ink stick 100. While the embodiment of FIG. 1 depicts an ink stick having square shaped end surfaces, in other configurations the ink stick can have ends with shapes of other regular or irregular polygons having a different number of edges.

The ink stick 100 is configured to be inserted into an ink stick insertion port 200, which has a width 208 and a height 212 that are substantially the same. The width 208 and height 212 of the insertion port 200 are substantially the same as the width 108 and height 112 of the ink stick 100 to enable the ink stick 100 to fit tightly into the insertion port 200 when one of the end surfaces 160 and 164 is loaded into the port opening. The length 104 of the solid ink stick 100 is greater than the width 208 and height 212 of the insertion port to prevent the ink stick 100 from being loaded into the port 200 with one of the side surfaces 168 inserted first. Consequently, the solid ink stick 100 can only be loaded into the port 200 with one of the end surfaces 160 and 164 inserted first.

Figure 2:
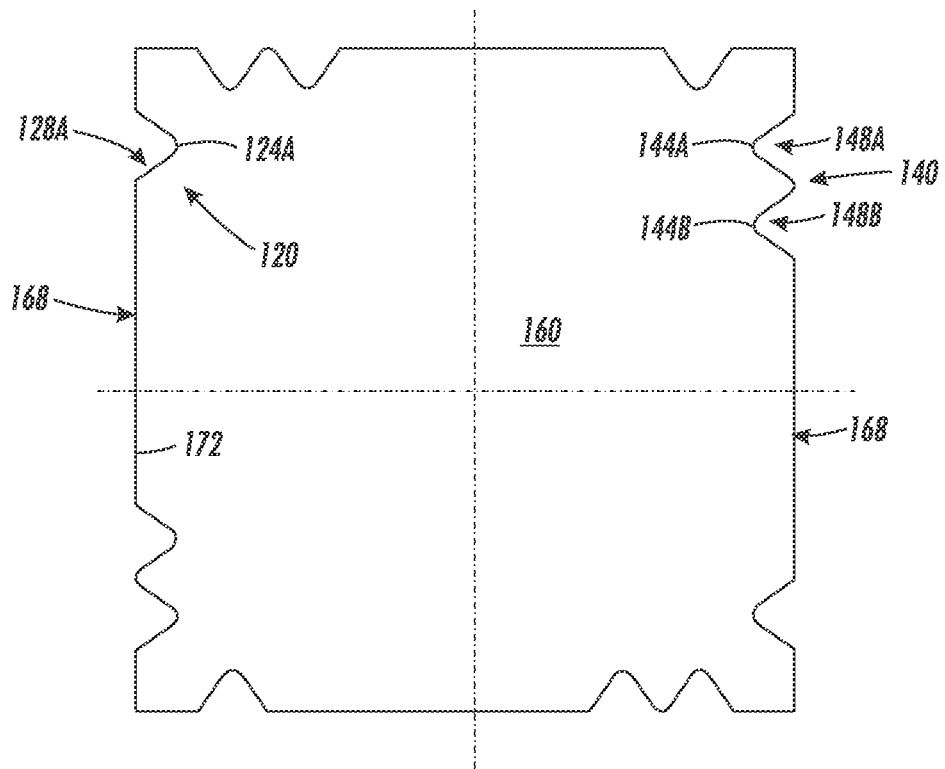
FIG. 2 is a side view of the ink stick of FIG. 1.
Figure 3:
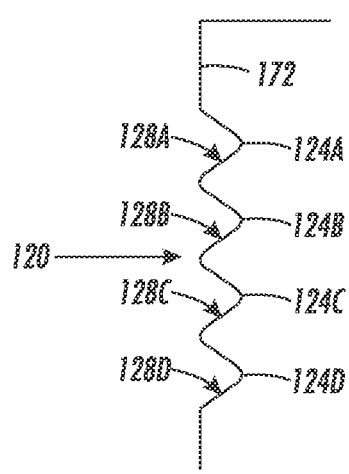
FIG. 3 is a side view of a portion of an ink stick configured to incorporate two types of data without severely restricting orientation of the ink stick during insertion into a printer.

With reference to FIG. 2 and continuing reference to FIG. 1, each end surface 160 and 164 of the ink stick 100 has four identical edges 172, each of which includes a first identifier 120 and a second identifier 140. Each of the first identifiers 120 have identical shapes and positions on each edge 172 of the end surfaces 160 and 164, while each of the second identifiers 140 also have identical shapes and positions on each edge 172 of the end surfaces 160 and 164. Opposite edges of the end surfaces 160 and 164 have identifiers on diagonally opposed sides of the edges and corresponding edges of the opposing end surfaces 160 and 164 have the first 120 and second 140 identifiers on diagonally opposed sides of the corresponding edges. Thus, when the ink stick 100 is rotated in increments of 90 degrees about an axis that passes through both centers of the end surfaces 160 and 164 or 180 degrees about an axis that passes through both centers of two opposite side surfaces 168, the identifiers 120 and 140 remain in the same position on each edge 172. The repetition of the identifiers 120 and 140 on each edge 172 therefore enables the ink stick 100 to be identified in the ink loader 200 without regard to the orientation of the side surfaces 168 or which of the end surfaces 160 and 164 is inserted first.

The first 120 and second 140 identifiers comprise one or more indentations formed in the side surfaces 168 of the ink stick 100 at the edges 172 of the end surfaces 160 and 164. In the illustration of FIG. 2, the first identifier 120 includes one indentation 124A, which has a surface 128A configured to reflect light. The surfaces of the indentations of the first identifier reflect light emitted by a diffuse light source (not shown). A light detector (not shown) is positioned and oriented to receive light from the indentation surface when the indentation 124A is present in the edge 172. Otherwise, the edge 172 disburses the light and the detector does not receive reflected light at an illumination level that would be determined to be a direct reflection. Thus, the light detector generates an electrical signal corresponding to an amount of reflected light received from the ink stick 100. A light detector is located to receive light reflected from an indentation at each possible position for an indentation that forms the first identifier. The different arrangements of indentations and the absence of indentations provide different information about the ink stick. In a similar manner, the port 200 includes a diffuse light source and a light detector for each possible indentation of the second identifier. These light detectors enable different arrangements of indentations for the second identifier to provide different information about a second data set for the ink stick. Because the first 120 and second 140 identifiers are identical on each edge 172 of the ink stick 100, rotating the ink stick by 90, 180, or 270 degrees about the axis through both centers of the end surfaces 160 and 164 (FIG. 1) does not alter the availability of the identifiers 120 and 140 to the light source and light detectors positioned and configured to detect and interrogate each identifier. Thus, an ink stick can be inserted in an ink loader in a variety of orientations, all of which enable the first and second identifiers to be detected and interrogated. The dimensions of this ink stick prevent the ink stick from being inserted into the loader in orientations that would not present the first and the second identifiers to the light source and light detectors. Thus, the ink stick can be easily inserted into the port since the ink stick is not constrained to be inserted in only one orientation of the different possible orientations of the ink stick. This advantage is particularly useful when, for example, the insertion port is obscured from view.

In one embodiment, the first identifier of each different configuration of the ink stick includes only one of the four indentations, and each of the different indentation locations corresponds to a color, for example cyan, magenta, yellow, and black (CMYK), of the ink stick. To enable improved color identification, indentation 124A can identify the ink stick as being a black ink stick, while indentations 124B, C, and D, respectively, can correspond to cyan, magenta, and yellow ink sticks. Note that although an advantage occurs from using length to prevent a sideways insertion, other aspect ratios and ink stick shapes, including a cubic stick, could be used.

Figure 4:
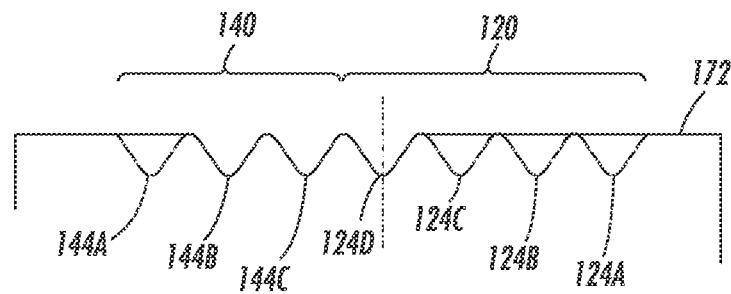
FIG. 4 is a side view of an edge of an ink stick of FIG. 1.

FIG. 4 depicts an edge 172 of an ink stick showing all potential locations of indentations of the first 120 and second 140 identifiers. While seven potential locations are shown in the illustrated embodiment, the reader should appreciate that any number of indentation locations can be used for the ink stick, depending on the size and shape of the indentations, the size of the ink stick, and the number of optical sensors in the printer. The first identifier 120 includes four locations for indentations 124A-D, with one or more of the locations having an indentation, for example indentation 124D. Likewise, the second identifier 140 includes three locations for indentations 144A-C. Thus, each ink stick can be configured with an indentation at different positions, such as, for example, indentations 144B and 144C.

In the embodiment of FIG. 4, the indentations of the first and second identifiers are all identical. However, the reader should appreciate that each indentation of the first and second identifiers can have different shapes, angles, sizes, and spacing, depending on the arrangement of sensors in the printer with which the ink stick will be used. In one practical embodiment, each of the V-shaped indentations are spaced apart by about 5.6 millimeters center-to-center with each indentation having a depth of approximately 3.0 millimeters and the surfaces of the indentation forming an angle of about 68 degrees. The surface from which the light reflects is therefore at an angle of approximately 56 degrees with respect to the corresponding side surface. Additionally, the depths of the indentations inward from the stick end need not be identical.

Figure 5:
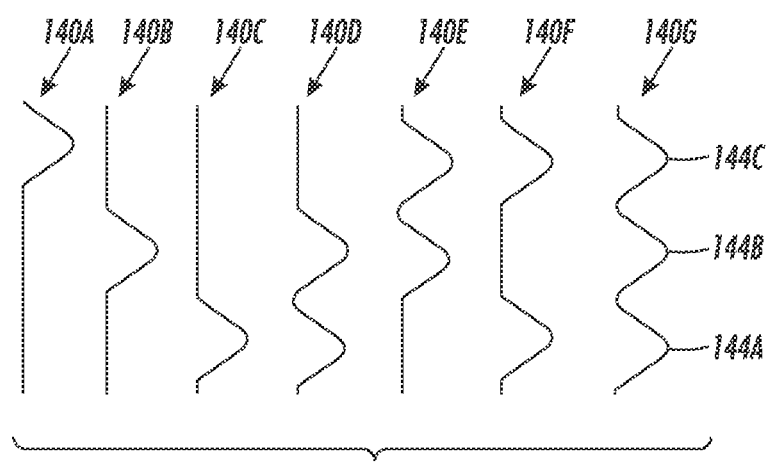
FIG. 5 is a side view of a variety of identifier configurations in an ink stick configured to incorporate two types of data without severely restricting orientation of the ink stick during insertion into a printer.

In one embodiment, the second identifier 140 enables identification of a model, printer series, pricing, marketing program, geographic compatibility, and/or other data about an ink stick. As shown in FIG. 5, the illustrated embodiment includes three locations for indentations 144A-C, enabling seven different arrangements of indentations for second identifiers 140A-G. Thus, the second identifier can identify series, model, pricing, program, compatibility, or other data about seven different ink sticks. Any practical number of indentations could be used to provide fewer or greater differentiators. For example, configurations with four possible indentations provide 15 different ink stick identifiers. In all cases, the absence of at least one indentation would not be likely to be of use so the combination totals identified above exclude that one condition. Using more than one indentation for the representation of color is also possible to provide additional ink stick identification, for example, to differentiate the type of colorant, such as dye or pigment colorant, or other different ink formulations.

Figure 6:
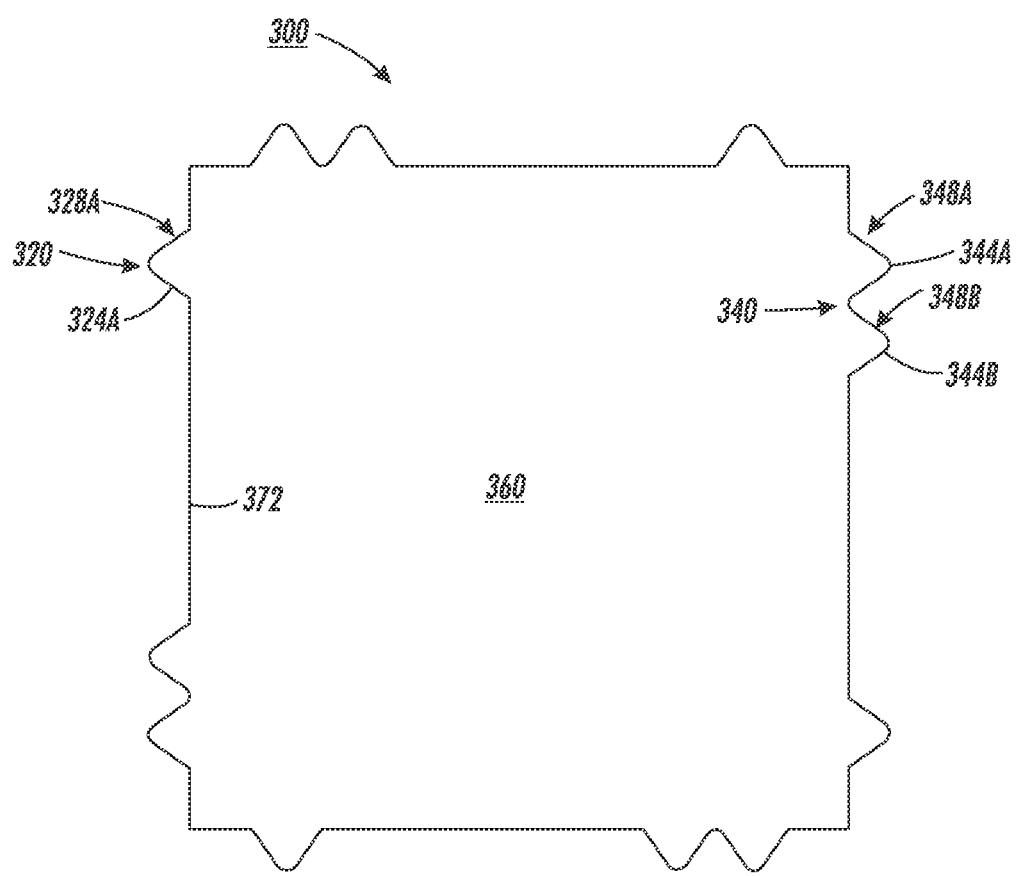
FIG. 6 is a side view of another ink stick configured to incorporate two types of data without severely restricting orientation of the ink stick during insertion into a printer.

FIG. 6 shows another embodiment of an ink stick 300 having identical identifiers 320 and 340 on a plurality of edges 372. The ink stick 300 is substantially identical to the embodiment of FIG. 1-2, except that the first 320 and second 340 identifiers on each edge 372 include protrusions 324A and 344A-B, respectively, instead of indentations. The surface 328A of the protrusion 324A reflects light from an optical source to an optical sensor to enable the sensor to identify the first identifier Likewise, the surfaces 348A-B of protrusions 344A-B reflect light from a light source to the light sensors positioned to receive reflected light from the protrusions to enable the sensors to generate signals corresponding to the arrangement of protrusions forming the second identifier 340. The repetition of both identifiers 320 and 340 on each edge 372 enables the stick 300 to be rotated in 90 degree increments about an axis directed into the two dimensional plane of the figure through the center of the surface 360 without hindering identification of the ink stick 300 in a port receiving the ink stick. The identifiers are repeated on a surface (not shown) opposite surface 360 in the same manner as the identifiers of the embodiment of FIG. 1-2 to enable either surface of the ink stick to be inserted first without adversely impacting identification of the ink stick. The dimensions of the ink stick 300 are sized so the distance between the end surfaces having the protrusions is greater than the width and the height of the ink stick. This configuration enables the port 200 to be sized to accept the ink stick 300 including the protrusions 324A, 344A, and 344B, while preventing the ink stick 300 from being inserted in an orientation in which the identifiers 320 and 340 cannot be read.

It will be appreciated that variations of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A solid ink stick comprising:
    a solid ink body having a length, a width, a height, and two ends;
    a first surface having a shape of a polygon, each end edge of the polygon of the first surface including a first identifier and a second identifier, each of the first identifiers on the edges of the first surface being identical to one another and the first identifiers on opposite edges of the polygon being on opposite portions of the opposite edges, and each of the second identifiers on the edges of the first surface being identical to one another and the second identifiers on opposite edges of the polygon being on opposite portions of the opposite edges;
    a second surface having a shape that is the shape of the polygon of the first surface and is located on a side of the solid ink body that is opposite the first surface, each edge of the polygon of the second surface including the first identifier and the second identifier, each of the first identifiers on the edges of the second surface being identical to one another and the first identifiers on opposite edges of the polygon of the second surface being on opposite portions of the opposite edges of the polygon of the second surface and being on opposite portions of edges of the polygon of the first surface that are opposite the edges of the second surface on the solid ink body, and each of the second identifiers on the edges of the second surface being identical to one another and the second identifiers on opposite edges of the polygon of the second surface being on opposite portions of the opposite edges of the polygon of the second surface and being on opposite portions of edges of the polygon of the first surface that are opposite the edges of the second surface on the solid ink body.

2. The solid ink stick of claim 1 wherein the polygon is a square.

3. The solid ink stick of claim 2, the length of the solid ink stick between the first surface and the second surface is greater than the width and the height of the solid ink stick body.

4. The solid ink stick of claim 1 further comprising:
    the first identifier corresponding to a color of the solid ink stick; and
    the second identifier corresponding to data about the solid ink stick.

5. The solid ink stick of claim 4, the first identifier comprising:
    at least one indentation in each edge of the polygon of the first surface and the second surface, a location of the at least one indentation in the edge enabling identification of the color of the solid ink stick.

6. The solid ink stick of claim 4, the second identifier comprising:
    at least one indentation in each edge of the polygon of the first surface and the second surface, at least a location of the at least one indentation in the edge enabling identification of the data about the solid ink stick.

7. The solid ink stick of claim 6, the first identifier comprising:
    at least one more indentation in each edge of the polygon of the first surface and the second surface, a location of the at least one more indentation in the edge enabling identification of the color of the solid ink stick.

8. The solid ink stick of claim 7, each indentation of the first identifier and the second identifier being substantially identical in shape and size.

9. The solid ink stick of claim 4, the first identifier comprising:
- at least one protrusion in each edge of the polygon of the first surface and the second surface, a location of the at least one protrusion in the edge enabling identification of the color of the solid ink stick.

10. The solid ink stick of claim 4, the second identifier comprising:
- at least one protrusion in each edge of the polygon of the first surface and the second surface, at least a location of the at least one protrusion in the edge enabling identification of the data about the solid ink stick.

11. The solid ink stick of claim 10, the first identifier comprising:
- at least one more protrusion in each edge of the polygon of the first surface and the second surface, a location of the at least one more protrusion in the edge enabling identification of the color of the solid ink stick.

12. The solid ink stick of claim 11, each protrusion of the first identifier and the second identifier being substantially identical in shape and size.

13. A solid ink stick comprising:
- a solid ink body having a length, a width, and a height that form a rectangular solid, the width and height of the solid ink body being equal and the length of the solid ink body being greater than the width and the height of the solid ink body;
- a first end surface having a square shape that is defined by the width and the height of the solid ink body, each edge of the first end surface including a first identifier and a second identifier, each of the first identifiers on the edges of the first end surface being identical to one another and the first identifiers on opposite edges of the first end surface being on opposite portions of the opposite edges, and each of the second identifiers on the edges of the first end surface being identical to one another and the second identifiers on opposite edges of the first end surface being on opposite portions of the opposite edges;
- a second end surface having the square shape that is defined by the width and the height of the solid ink body and is located on a side of the solid ink body that is opposite the first surface, each edge of the second end surface including the first identifier and the second identifier, each of the first identifiers on the edges of the second end surface being identical to one another and the first identifiers on opposite edges of the second end surface being on opposite portions of the opposite edges of the second end surface and being on opposite portions of edges of the first end surface that are opposite the edges of the second end surface on the solid ink body, and each of the second identifiers on the edges of the second end surface being identical to one another and the second identifiers on opposite edges of the second end surface being on opposite portions of the opposite edges of the second end surface and being on opposite portions of edges of the first end surface that are opposite the edges of the second end surface on the solid ink body; and
- the first identifiers corresponding to a color of the ink stick and a second identifiers corresponding to data about the ink stick.

14. The solid ink stick of claim 13 further comprising:
- the first identifiers comprising at least one indentation in each edge of the first and second square end surfaces, a location of the at least one indentation of the first identifiers enabling identification of the color of the solid ink stick; and
- the second identifier comprising one or more indentations in each edge of the first and second square end surfaces, a number of the one or more indentations of the second identifiers and a location of the one or more indentations of the second identifiers enabling identification of the data about the solid ink stick.

15. The solid ink stick of claim 14, each indentation of the first and second identifiers comprising:
- a surface positioned at a predetermined angle with respect to the edge in which the indentation is formed.

16. The solid ink stick of claim 13 further comprising:
- the first identifiers comprising at least one protrusion in each edge of the first and second square end surfaces, a location of the at least one protrusion of the first identifiers enabling identification of the color of the solid ink stick; and
- the second identifier comprising one or more protrusions in each edge of the first and second square end surfaces, a number of the one or more protrusions of the second identifiers and a location of the one or more protrusions of the second identifiers enabling identification of the data about the solid ink stick.

17. The solid ink stick of claim 14, each protrusion of the first and second identifiers comprising:
- a surface rising at a predetermined angle from the edge in which the protrusion is formed.

* * * * *